Dec. 11, 1973  C. J. ALBRIGHT ET AL  3,778,524
METHOD FOR CLOSING THE OPENING OF A FOOD COOKING RECEPTALE
Filed Sept. 29, 1971  3 Sheets-Sheet 1

INVENTORS:
CHARLES JERE ALBRIGHT
CLIFFORD E. FITCH, SR.
CLIFFORD E. FITCH, JR.
BY:
ATT'Y

Dec. 11, 1973 C. J. ALBRIGHT ET AL 3,778,524
METHOD FOR CLOSING THE OPENING OF A FOOD COOKING RECEPTALE
Filed Sept. 29, 1971 3 Sheets-Sheet 2
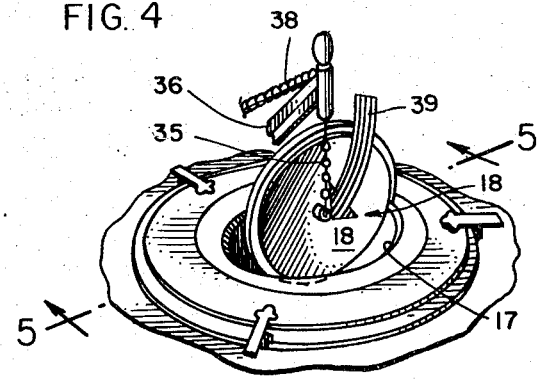
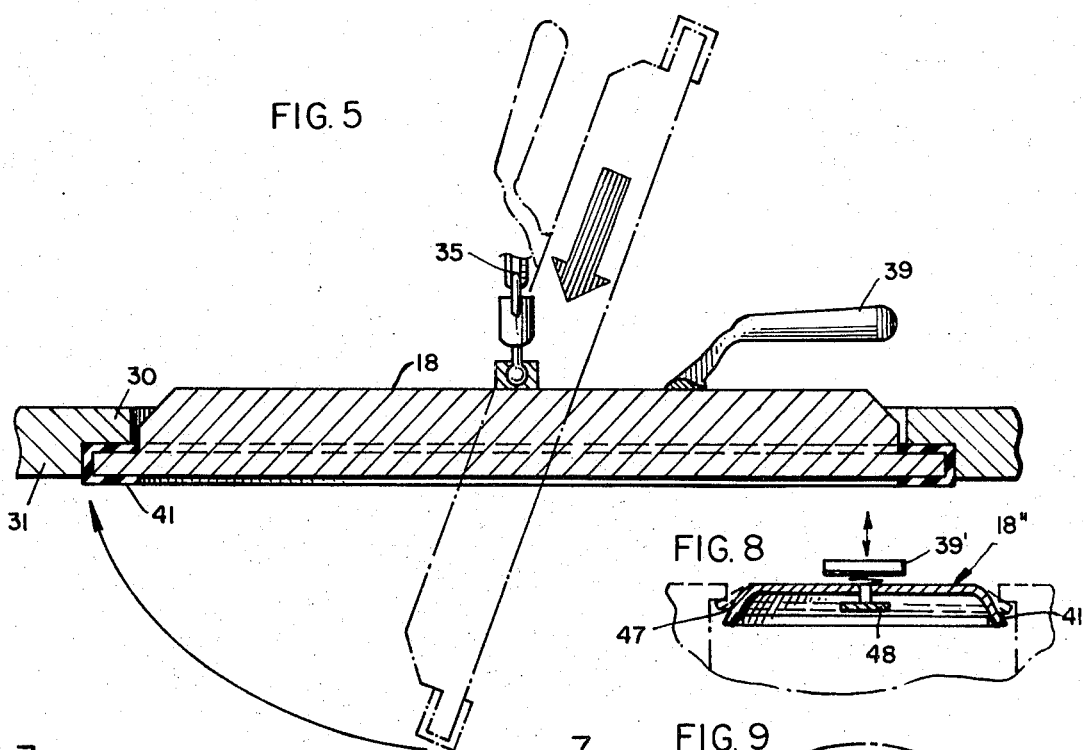
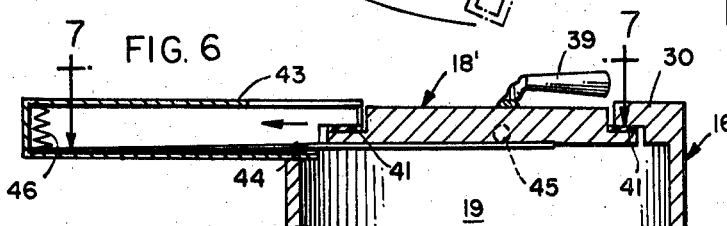
INVENTORS:
CHARLES JERE ALBRIGHT
CLIFFORD E. FITCH, SR.
CLIFFORD E. FITCH, JR.
BY Edwin Phelps
ATT'Y Dec. 11, 1973   C. J. ALBRIGHT ET AL   3,778,524
METHOD FOR CLOSING THE OPENING OF A FOOD COOKING RECEPTALE
Filed Sept. 29, 1971

INVENTORS:
CHARLES JERE ALBRIGHT
CLIFFORD E. FITCH, SR.
CLIFFORD E. FITCH, JR.
BY: Edwin Phelps
ATT'YS United States Patent Office 3,778,524
Patented Dec. 11, 1973

3,778,524
METHOD FOR CLOSING THE OPENING OF A FOOD COOKING RECEPTACLE
Charles Jere Albright, 83 E. Elm St., Chicago, Ill. 60611; and Clifford E. Fitch, Sr., 279 Homewood Court; and Clifford E. Fitch, Jr., 38 W. 23rd St., both of Chicago Heights, Ill. 60411
Continuation-in-part of application Ser. No. 793,392, Jan. 23, 1969. This application Sept. 29, 1971, Ser. No. 184,892
Int. Cl. A22c 18/00; A23l 1/00
U.S. Cl. 426—230
4 Claims

ABSTRACT OF THE DISCLOSURE

A closure lid and method for effecting an air-tight seal of the opening in a receptacle for the pressurized cooking of food in high temperature, non-aqueous liquids, wherein the closure lid is manually positioned through said opening into the receptacle and is held upwardly into sealing engagement with the rim of said opening by the pressure in said receptacle, said closure lid being manually removable from said opening when the pressure in said receptacle is released.

BACKGROUND OF THE INVENTION

This application is a continuation-in-part of Ser. No. 793,392, filed Jan. 23, 1969, entitled Method of Air-Sealed Pressurized Receptacle, now abandoned.

This invention relates to a method and apparatus for air-tight closing and sealing of the opening of a receptacle for the pressurized cooking of foods in high temperature, non-aqueous liquids.

Apparatus for the cooking of food, especially meat, in highly heated, non-aqueous liquids under pressure, is the subject matter of a number of patents issued during recent years. Examples of such apparatus are shown in the Pats. Nos. 2,827,379; 2,917,200; 2,918,861; 2,938,648; 2,964,215; and 3,232,767. Some of these have been in commercial use.

Such types of apparatus are used with the cooking chamber operating at temperatures ranging from 325 to 380 degrees Fahrenheit, with pressures ranging from 14 to 35 p.s.i., for cooking periods ranging from six to twelve minutes. The general optimum for these conditions are 35 p.s.i. at a temperature of approximately 380 degrees F. The time periods have to be determined by the size and the nature of the food products being processed, and the desired cooking conditions of foods.

Each of the structures of these patents involves some kind of closure lid for the receptacle wherein the foods are cooked. In each of these patents the closure lid is of a comparatively heavy nature, mounted on one or more heavy, upright posts anchored to the receptacle supporting framework. Such mounting requires the closure lid to swing horizontally into and out of use position to respectively seal the receptacle for the cooking operation and open the receptacle to remove the cooked foods. Aside from being expensive to make, such closure lids are bulky and considerable time is required to secure such a closure lid in and remove it from its sealed position on the receptacle.

Moreover, should one be careless in securing the closure lid in its intended sealed position, or be hasty in releasing it, the internal pressure might cause an unexpected retraction of the closure lid. This could result in a blast of hot liquid outwardly and upwardly of the cooking receptacle. Very harmful consequences could result.

This invention provides a means and method of sealing such high temperature, high pressure devices for cooking foods in non-aqueous liquids, wherein the temperature may reach 380 degrees Fahrenheit and the pressure may reach 35 p.s.i., wherein the closure is urged into tighter sealing relationship by high pressure and cannot be removed until the pressure within the cooking receptacle subsides to a safe level. Moreover, the closure is lightweight, inexpensive, and easy to use.

OBJECTS OF THE INVENTION

An object of this invention is to provide a means and method of sealing high pressure, high temperature cooking receptacles for cooking food in non-aqueous liquids, wherein the pressure within the receptacle is utilized to effect the seal.

It is another object of this invention to provide a closure means and method of sealing high pressure, high-temperature and cooking receptacles for cooking food in non-aqueous liquids, wherein the closure means is positioned inside the receptacle and held in sealed, closed position solely by the pressure within the receptacle.

A further object is to provide a closure means or lid as above which may be moved into and out of receptacle sealing position either axially, radially, or both axially and radially of the receptacle.

BRIEF DESCRIPTION OF THE DRAWINGS

FIG. 4 is a perspective view showing the closure lid being inserted into or removed from the cooking receptacle;

FIG. 5 is a much enlarged view taken on the plane of the line 5—5 of FIG. 4;

FIG. 6 is a side view of a modified form of receptacle with an internally mounted closure lid;

FIG. 7 is a plan with of FIG. 6 taken on the plane of the line 7—7 of FIG. 6;

FIGS. 8 and 9 show views of another type of closure lid;

DETAILED DESCRIPTION OF THE INVENTION

Figure 1:
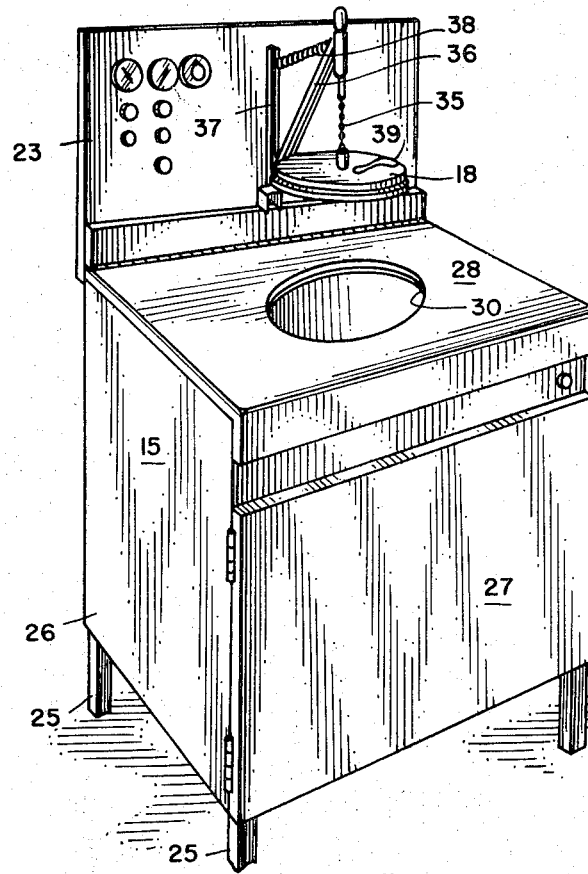
FIG. 1 is a front perspective view of a cabinet enclosed, food cooking receptacle equipped with one form of closure lid embodying the hereinbefore stated concept.

Referring now to the drawings, wherein like reference numerals refer to like parts throughout the several views, an apparatus for use with which such types of closure lids embodying the foregoing concept are required is shown in FIG. 1 and is fully described in copending application, Ser. No. 750,353, filed Aug. 5, 1968, now Pat. 3,655,411, Apr. 11, 1972. Such apparatus comprises a cabinet 15 wherein is suspended a food cooking receptacle 16 (FIG. 1) having a food inserting and withdrawal opening 17 with a closure lid 18 for sealing the cooking chamber 19 when the apparatus is in use. Associated with this receptacle are a series of facilities for heating the cooking liquid contained in the receptacle 16, creating a pressure in the cooking chamber 19 and controlling the timed cooking period.

As set forth in detail, said patent shows and describes that hot liquid is introduced into the cooking chamber, the food is placed into the chamber and hot liquid and the closure placed in closing position. The pressure immediately builds up in said cooking chamber and seals the closure. After the predetermined time cooking period, an appropriate means is actuated to immediately withdraw the hot liquid and simultaneously therewith the pressure will drop to such a point that the closure may be removed affording access to the cooked food.

The cabinet 15, as herein shown, and as described in the aforesaid co-pending application, involves a frame work of angle-bars 25 mounting fixed side panels 26, a hinged front door 27 and a hinged top 28. An instrument panel 23, fixed along the rear of the cabinet 15, mounts a series of units (not shown) which control the functioning of the apparatus, as explained in the aforesaid application.

The food cooking receptacle 16, as herein shown, is a relatively heavy metal cylinder wherein the opening 17 is defined by a suitable retaining rim 30, anchored to or integrated with the receptacle.

Several adaptations of a closure lid are shown in the accompanying drawings, as noted in the foregoing figures. Whatever their respective forms and positioning, relative to the receptacle opening, they are a very significant and critical feature of this development for ensuring the facile and firm sealing of the cooking chamber 19 during the cooking operation. This primary significance of such a closure lid 18 is that in use position it is located within the receptacle below the rim 30 and retained in such use position by the pressure in the cooking chamber 19 to the seal the opening 17 during the cooking operation, and does not depend on separate support means for clamping the closure lid 18 in sealed position within the receptacle.

Figure 2:
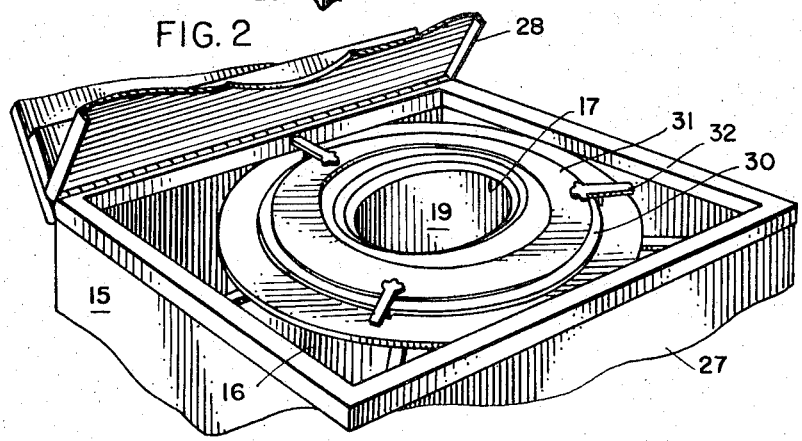
FIG. 2 is an enlarged, top perspective, with the cabinet top retracted, showing a form of receptacle retaining ring wherein the closure lid is in position to seal the opening of the cooking receptacle.
Figure 3:
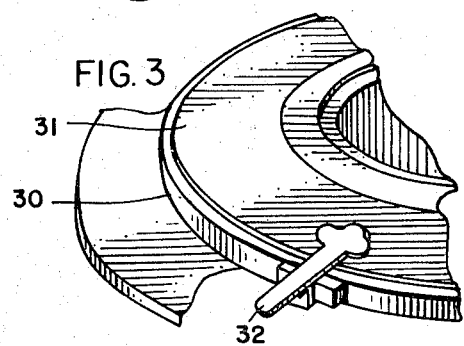
FIG. 3 is an enlarged view of a portion of the detachable locking ring shown in FIG. 2.

As shown in FIG. 2, the above noted rim 30 is integrated with a ring secured to the top of the receptacle 16. To this ring is secured an annulus 31 removably anchored by a series of retaining latches 32.

A suitable hand grip 39 is fixed on each adaptation of closure lid 18 to facilitate the shifting thereof into and out of use position. Also, a narrow peripheral ring 41, of a suitable resilient material, is fixed on the rim of each such adaptation of the closure lid 18 so that in receptacle closing position this ring ensures sealing the cooking chamber 19.

The closure lid of FIGS. 1, 4 and 5 is suspended on a cord or chain 35 from an arm 36 hinged to a bracket 37 swingably anchored to the instrument panel 23. A spring 38 normally elevates the closure lid 18 into a position above the cabinet 15 and the bracket permits swinging the lid off to one side of the opening 17 to the cooking receptacle 16. Hence, when the closure lid 18 is in a retracted position, it does not interfere with the insertion of food into and its removal from the cooking receptacle 16.

The closure lid 18 of FIGS. 6 and 7 is shown elliptical in contour, as in FIGS. 1, 4 and 5. However, it could be circular in contour if preferred. Such an adaptation is shown mounted within the receptacle 16 for horizontal shifting between retracted and use positions. To that end the receptacle 16 is formed with a horizontal extension 43 wherein a pair of horizontally-spaced tracks 43' are fixed on intermediate pivots 44. The closure lid 18' mounts rollers 45 riding in the tracks 43' to permit its easy shifting into and out of receptacle closing position, as circumstances require. A pair of springs 46 at the outer ends of the tracks 43' serve to pivot the tracks 43' about pivots 44 and thus to press the closure lid 18 into initial sealing contact with the rim 30, pending the development of pressure in the cooking chamber 19, when the pressure will hold the closure lid 18 tightly in sealing contact with rim 30.

The closure lid 18" of FIGS. 8 and 9 is made of a suitable flexible metallic material or the like and has an elliptical contour formed with a narrow offset perimeter 47. In this modification of the invention, a suitable hand grip 39' is supported on the closure lid 18". The hand grip 39' is rotatable and mounts a bar 48 on its inner end.

The length of this bar 48 is only slightly less than the longer diameter of the elliptical shaped closure lid 18". Thus, when the bar 48 is turned across the shorter diameter of this modification of the closure lid, the outer ends of the bar 48 will press the flexible perimeter outwardly to a contour slightly larger than the contour of the rim 30 of the receptacle. This will force the rim 47 outwardly to seat the resilient ring 41 against the receptacle rim 30 for temporary position pending the development of pressure in the cooking chamber 19, as before.

Figure 10:
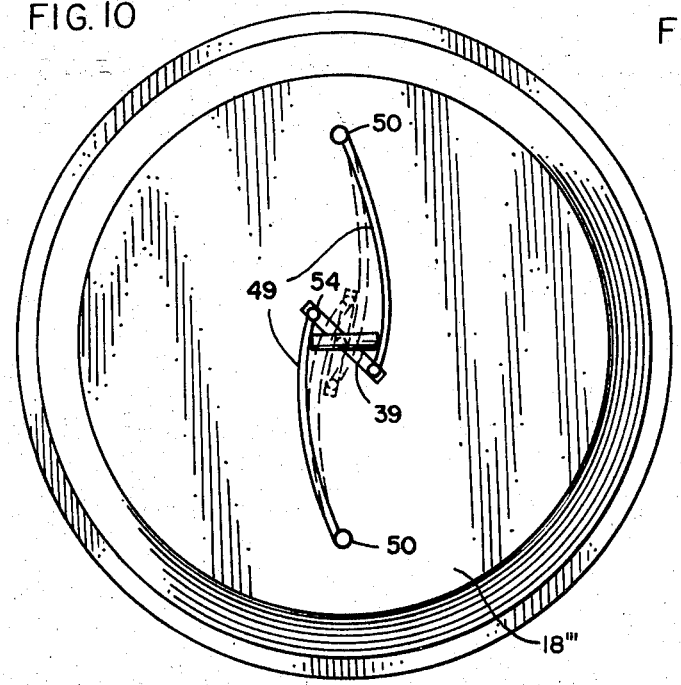
FIGS. 10 and 11 show adaptation of closure lid 18 similar to FIGS. 8 and 9 but being of circular contour.
Figure 11:
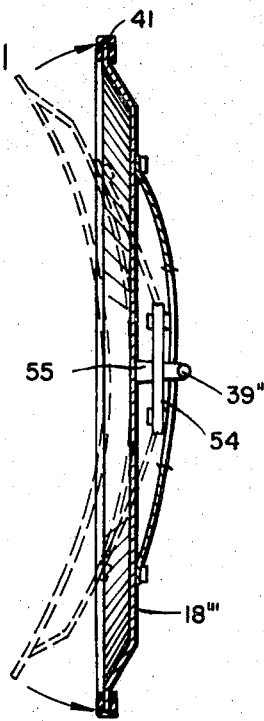

A further modification 18''' of the closure lid is shown in FIGS. 10 and 11, illustrated in much larger dimension and without association with a receptacle 16 in order to more clearly indicate the facility whereby it is capable of the required flexing to enable its insertion through and removal from opening 17 and its movement into sealing contact with rim 30. This modification is made of a suitable flexible metallic material and has a normally concave configuration of circular contour. A centrally mounted hand grip 39" is journaled on a hub 55 fixed to the closure lid 18''' and mounts a plate 54 attached to a pair of arcuate shaped resilient rods 49 which are anchored at their exterior ends to diametrically oppositely positioned pins 50 on the closure lid.

Figure 12:
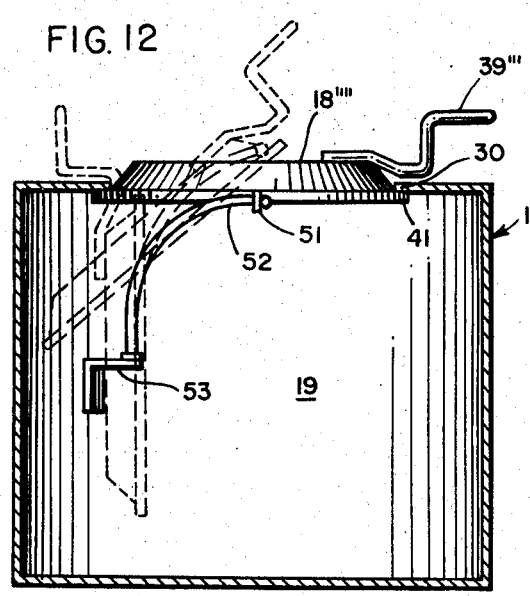
FIGS. 12 and 13 show a further adaptation of closure lid mounted within the receptacle for shifting between vertical retracted and horizontal in-use positions.
Figure 13:
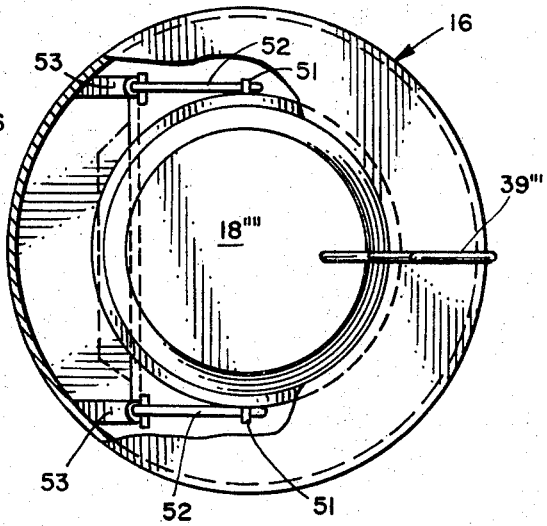

An even further modification 18'''' of the closure lid is shown in FIGS. 12 and 13 and is circular in contour with a cross-sectional shape substantially as that of FIGS. 4 and 5. In this instance, the closure lid 18'''' is shiftably supported by means of eyelets 51 on a pair of arched, reslient rods 52 mounted on the receptacle 16 in spaced apart, parallel relationship. The two parallel rods 52 are secured at their inner ends by angle brackets 53 to the interior of the receptacle 16 with the upper arched portions disposed horizontally and free to permit flexing of the rods. A hand grip 39''' is fixed to the closure lid 18'''' and positioned to permit the shifting of the closure lid 18'''' between a vertically retracted position within the receptacle 16, shown in phantom lines, and an in-use horizontal position, as shown in full lines.

With the closure lid of any of the aforedescribed modifications in place, the apparatus is ready for use to cook food as explained in greater detail in the aforesaid co-pending application, Ser. No. 750,353, now Pat. 3,655,411.

The operational use of the several closure lid modifications described herein is substantially the same.

When the receptacle 16 is ready for use to the point of having a batch of food placed in the cooking chamber 19, the closure lid according to any of the modifications is placed in position inwardly below the opening 17 to seat the resilient ring 41 in contact with the inner face of the rim 30, as shown in FIGS. 5, 6, 9 and 12. This being effected, the requisite instruments on the panel 23 are set to initiate the requisite pressure, temperature and timed cooking conditions in the cooking chamber 19. Almost instantly, the interior pressure condition in the receptacle chamber 19 will press the closure lid firmly against the rim 30 and secure it in such position throughout the timed cooking period.

At the end of the timed cooking period, the pressure in the chamber 19 is reduced in a suitable manner as determined by an appropriate means, not shown, controlled from the instrument panel 23 and the closure lid may be retracted to permit the removal of the cooked food.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

We claim:

1. The method of effecting the air sealed closing of the opening of a receptacle for the pressurized cooking of food in high temperature, non-aqueous liquids comprising positioning a closure lid over the receptacle opening within the receptacle, and retaining the closure lid in the air sealed position solely by the pressure in the receptacle during the food cooking period.

2. The method as set forth in claim 1 wherein the closure lid is manually inserted through the opening into the receptacle and positioned over the receptacle opening within the receptacle before the beginning of the cooking period, and manually removed through said opening after the cooking period.

3. The method as set forth in claim 2 wherein the closure lid is manually shifted from a retracted position within the receptacle into position over and closing the receptable opening before the beginning of the cooking period, and manually returned to the retracted position within the receptacle at the end of the cooking period.

4. The method of sealing the opening of a receptacle, for cooking food in hot non-aqueous liquid under pressure therein, comprising placing a closure lid within the receptacle and causing the lid to be secured in sealed position against the inner surface of the food receptacle opening by the pressure within the receptacle during a cooking period.

References Cited
UNITED STATES PATENTS
3,655,411  4/1972  Albright _____ 99—330

HYMAN LORD, Primary Examiner